United States Patent
Meganathan et al.

(10) Patent No.: US 10,310,704 B2
(45) Date of Patent: Jun. 4, 2019

(54) SYSTEM AND METHOD TO HAVE LOCATION BASED PERSONALIZED UI UPDATES ON MOBILE APP FOR CONNECTED USERS IN SECURITY, VIDEO AND HOME AUTOMATION APPLICATIONS

(71) Applicant: Honeywell International Inc., Morristown, NJ (US)

(72) Inventors: Deepak Sundar Meganathan, Bangalore (IN); Ravikumar Vemagal Aswath, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 429 days.

(21) Appl. No.: 14/489,748

(22) Filed: Sep. 18, 2014

(65) Prior Publication Data

US 2016/0085412 A1    Mar. 24, 2016

(51) Int. Cl.
*G06F 3/0481* (2013.01)
*G06F 3/0482* (2013.01)
(Continued)

(52) U.S. Cl.
CPC ........ *G06F 3/04817* (2013.01); *G06F 3/0482* (2013.01); *G06F 16/29* (2019.01);
(Continued)

(58) Field of Classification Search
CPC ............... G06F 3/04817; G06F 3/0482; G06F 17/30241; G08C 17/00; G08C 2201/30;
(Continued)

(56) References Cited

U.S. PATENT DOCUMENTS

| 8,380,226 B2 | 2/2013 | Clipsham |
| 9,374,874 B1 * | 6/2016 | Ewing ................ H05B 37/0272 |

(Continued)

FOREIGN PATENT DOCUMENTS

WO    2014/203358 A1    12/2014

OTHER PUBLICATIONS

Luca Reggiani, Jocelyn Fiorina, Sinan Gezici, Simone Morosi, Montse Najar, "Radio Context Awareness and Applications", 2013, Hindawi Publishing Corporation, Journal of Sensors, vol. 2013 Article ID 491092, retrieved on Sep. 28, 2018 from web at https://www.hindawi.com/journals/js/2013/491092 (Year:2013).*

(Continued)

*Primary Examiner* — Shourjo Dasgupta
(74) *Attorney, Agent, or Firm* — Husch Blackwell LLP

(57) ABSTRACT

An apparatus including a plurality of user controlled devices, each located at a respective predetermined location within a geographic area of a user, a respective location indicator associated with each of the plurality of user controlled devices, a portable user device including a respective controlling application of each of the plurality of user controlled devices embodied in a memory of the portable user device, a monitoring processor of the portable user device that detects a location of the portable user device within the geographic area based upon a wireless signal from one of the respective location indicators and an interface processor of the portable device that loads the controlling application of one of the plurality of user controlled devices based upon the detected location of the portable user device.

16 Claims, 6 Drawing Sheets

(51) Int. Cl.
*G06F 17/00* (2006.01)
*G06F 17/30* (2006.01)
*G08C 17/00* (2006.01)
*H04W 4/02* (2018.01)
*G06F 16/29* (2019.01)
*H04L 29/08* (2006.01)

(52) U.S. Cl.
CPC .............. *G08C 17/00* (2013.01); *H04L 67/18* (2013.01); *H04W 4/02* (2013.01); *G08C 2201/30* (2013.01); *G08C 2201/91* (2013.01); *G08C 2201/93* (2013.01)

(58) Field of Classification Search
CPC . G08C 2201/91; G08C 2201/93; H04L 67/18; H04W 4/02
See application file for complete search history.

(56) References Cited

U.S. PATENT DOCUMENTS

| | | | |
|---|---|---|---|
| 2003/0011467 A1* | 1/2003 | Suomela | G08C 17/02 340/7.1 |
| 2010/0145479 A1* | 6/2010 | Griffiths | G01D 21/00 700/17 |
| 2010/0217837 A1* | 8/2010 | Ansari | G06Q 30/04 709/218 |
| 2010/0312366 A1* | 12/2010 | Madonna | H05B 37/0245 700/90 |
| 2012/0154108 A1 | 6/2012 | Sugaya | |
| 2012/0280802 A1 | 11/2012 | Yoshida et al. | |
| 2013/0282280 A1* | 10/2013 | Patterson | G08B 7/062 701/533 |
| 2013/0331087 A1 | 12/2013 | Shoemaker et al. | |
| 2013/0335203 A1* | 12/2013 | Sun | G05B 15/02 340/12.5 |
| 2014/0005809 A1* | 1/2014 | Frei | H04L 29/1249 700/90 |
| 2014/0235265 A1 | 8/2014 | Slupik | |
| 2015/0074259 A1* | 3/2015 | Ansari | H04L 67/02 709/224 |
| 2015/0347683 A1* | 12/2015 | Ansari | H04L 63/08 726/7 |
| 2016/0029155 A1* | 1/2016 | Kerr | H04W 4/02 455/456.3 |
| 2016/0037332 A1* | 2/2016 | Egeler | G08C 17/02 455/420 |

OTHER PUBLICATIONS

Kathi Vian, Mike Liebhold, Anthony Townsend, "The Many Faces of Context Awareness: A Spectrum of Technologies, Applications, and Impacts", Sep. 2006, Technology Horizons Program, retrieved on Sep. 28, 2018 from web at http://www.iftf.org/uploads/media/SR-1014_ Many_Faces_Context_Awareness (Year: 2006).*

K. Scott, R. Benlamri, "Context-Aware Services for Smart Learning Spaces", Jul.-Sep. 2010, IEEE Transactions on Learning Technologies vol. 3 No. 3, retrieved on Sep. 28, 2018 from web at https://www.computer.org/csdl/trans/lt/2010/03/tlt2010030214.pdf (Year: 2010).*

Miguel S. Familiar, Jose F. Martinez, Lourdes Lopez, "Pervasive Smart Spaces and Environments: A Service-Oriented Middleware Architecture for Wireless Ad Hoc and Sensor Networks", 2012, retrieved on Sep. 28, 2018 from web at http://journals.sagepub.com/doi/pdf/10.1155/2012/725190.*

Extended European search report from corresponding EP Patent Application 15185567.3, dated Feb. 9, 2016.

Examination report from corresponding EP patent application 15185567.3, dated Mar. 20, 2018.

* cited by examiner

US 10,310,704 B2

SYSTEM AND METHOD TO HAVE LOCATION BASED PERSONALIZED UI UPDATES ON MOBILE APP FOR CONNECTED USERS IN SECURITY, VIDEO AND HOME AUTOMATION APPLICATIONS

FIELD

This application relates to home automation and to security systems and more particular to the control of such systems.

BACKGROUND

Systems are known to automate the homes and/or businesses of people. For example, security systems are known to automate the protection of people and assets within secured areas. Such systems may include a number of sensors placed throughout the area to detect and automatically report breaches in security.

Alternatively, one or more timers and/or sensors may be provided to automate and control illumination. For example, a timer may activate lighting at sunset and deactivate the lighting at sunrise. Similarly, a timer may be coupled to an environmental control system to lower heating and/or cooling costs during periods when the area is unoccupied.

Further efforts to automate such areas may include the use of sensors intended to detect the presence or absence of people. For example, passive infrared (PIR) sensor may be placed near the entrance to a room and used to activate the lighting when a person enters the room.

Similarly, a number of sensors may be placed throughout a space and coupled to a central processor. The processor may operate to learn a schedule of normal occupancy of the space. Towards this end, the processor may collect data on use of the space over a number of 24 hour, 7 day a week periods to learn a schedule of normal occupancy by authorized persons. Once the normal schedule of occupancy has been learned, the processor may control heating, cooling and lighting systems appropriately.

In many cases, the control of home or business automation may require any of a number of different control devices. For example, a security system may be controlled via one interface while temperature may be controlled via a separate wall-mounted interface. Because of the importance of automating occupied spaces, a need exists for better methods of automating the diverse systems in such spaces.

DETAILED DESCRIPTION

Figure 1:
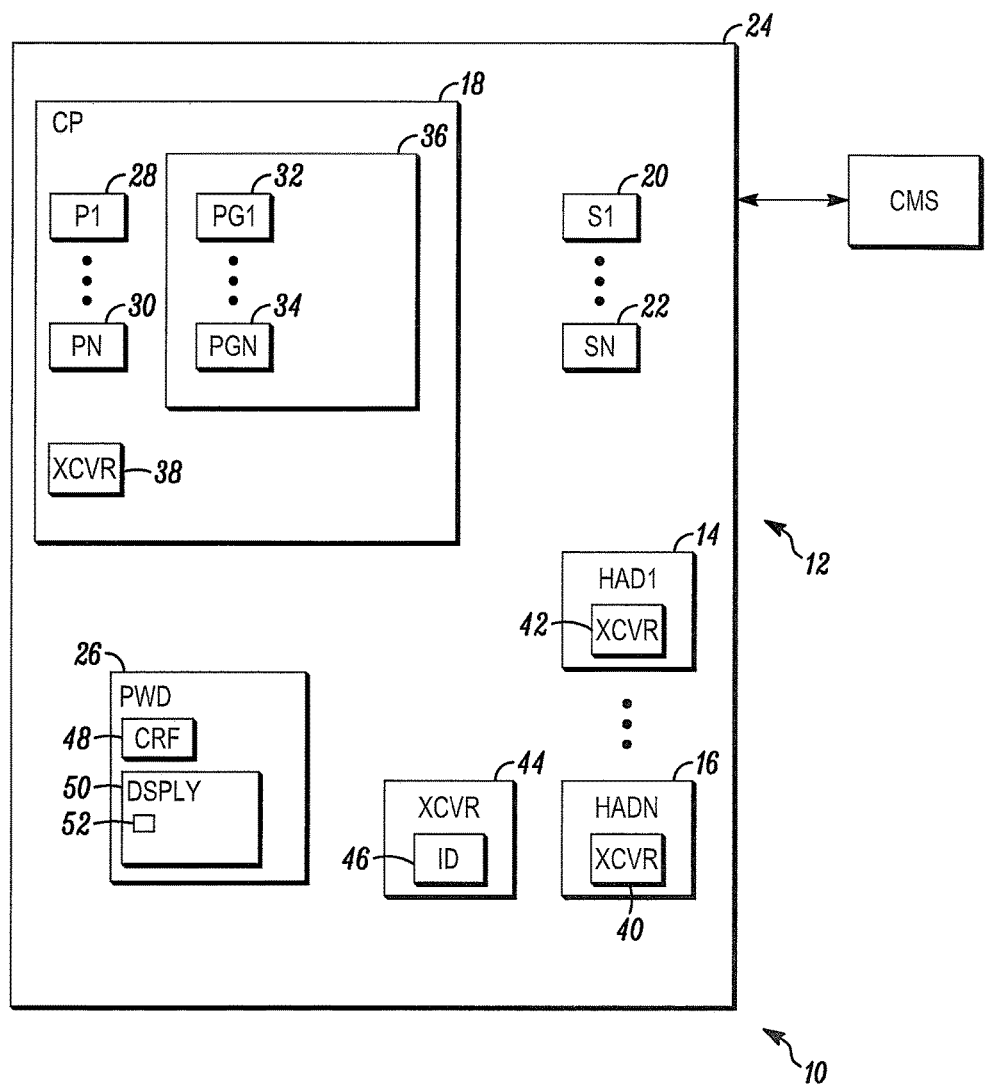
FIG. 1 illustrates a block diagram of a home automation system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a home or business automation system 10 shown generally in accordance with an illustrated embodiment. Included within the system may be a security system 12 and a number of stand-alone home automation devices 14, 16. As used herein, home or business automation systems or devices will be referred to herein generically using the terms "home automation systems" or "home automation devices."

The security system may include a number of sensors 20, 22 used to detect threats within a secured area 24. The secured area may be limited to the area within the walls of a home or business or may also include surrounding areas that are controlled by a human owner or user of the secured area.

The home automation system may also include a portable wireless device (e.g., an iPhone, Android device, etc.) 26 that provides a user interface with the home automation system. The portable user device may be used to control any of a number of parameters or other features of the secured area. For example, the user device may be used to activate/deactivate the lighting in one or more rooms, control the blinds on the windows, lock or unlock doors, control a garage door opener, or adjust the temperature, etc.

Included within the control panel and portable wireless device may be one or more processor apparatus (processors) 28, 30 that each operate under control of one or more computer programs 32, 34 loaded from non-transient computer readable medium (memory) 36. As used herein, reference to a step of a computer program is also reference to the processor the executed that step.

Under the illustrated embodiment, the interface to the home automation system presented on a display 50 of the portable user device is dynamically adjusted based upon the location of the portable device within the secured area. This is important because in some cases (e.g., opening and closing blinds on a window, etc.), it is not necessary to display control features (e.g., buttons) when the user is out of visual range of the controlled device. More importantly, however, is that the continuous display of control features that are appropriate for the physical location of the user only obfuscates other control features that could otherwise be useful to the user.

Under one illustrated embodiment, each of the home automation devices has a wireless location indicator 44. Under this embodiment, the location indicator simply indicates the presence and identity of a nearby home automation device.

Each location indicator includes a short range wireless transceiver that transmits an identification signal. The respective transceivers used in this regard may be Bluetooth Low-energy Devices or equivalent (e.g., as defined in the Bluetooth Core Specification Version 4.0).

During normal operation, an automation system monitoring processor operating within the portable wireless device may monitor an environment around the portable wireless device for home automation devices. The portable wireless device detects home automation devices via the wireless signal transmitted by a corresponding location indicator.

Under the illustrated embodiment, each location indicator transmits a unique system identifier 46. Included within the portable wireless device is a cross-reference file 48. The cross-reference file includes the unique identifier of each of the location indicators and a respective identifier of one or more home automation devices that correspond to the location indicator.

For example, the home automation control system of a home may include a lighting control device of a living room of the home. Located within the living room is a location indicator. During set up of the system, the user associates the location indicator in the living room with the lighting control device for the living room and saves the association in the cross-reference file. Each time that the portable user device enters the living room, the portable device detects the unique identifier of the location indicator and automatically loads the control application of the light control device.

In general, the portable user device continuously scans for location indicators. Upon detecting the location indicator of a home automation device, the monitoring processor automatically loads a corresponding driver (control application) for interfacing with and controlling the associated home automation device. The monitoring processor also displays an icon 52 for activating that driver (and home automation device) shown on the display of the portable wireless device.

Under one illustrated embodiment, the location indicator may be a separate transceiver that is used to indicate the proximity of one or more home automation devices. The corresponding home automation device(s) may have their own wireless transceivers, but the portable device does not load the programs for directly communicating with the home automation device(s) until receiving a signal from the associated location indicator.

Alternatively, the home automation device(s) may have dual purpose transceiver 38, 40, 42 that incorporates the functionality of the location indicator 44. As in previous embodiments, the display of the portable wireless device does not display any control features of a home automation device until the portable wireless device detects the unique identifier from an associated location indicator. Upon detecting the location indicator, the display of the portable device displays the control features of the corresponding home automation device.

In general, many conventional residential security systems, connected home systems and residential home automation systems are controlled and monitored through mobile devices such as smart phones and tablets. The controlled devices may be from any of a number of different categories (e.g., security, video, home automation, etc.). Examples may include lighting, blinds (window curtains), locks, thermostats, switches (e.g., coffee pot), door or interior cameras, door sensors, motion sensors, glass break sensors, etc. Most of the controls and options provided in these conventional mobile applications include the use of more or less static icons and fixed controls (e.g., buttons/icons to turn on/off the lights, buttons/icons to control the blinds, buttons/icons to lock/unlock the door, buttons/icons to arm/disarm the security system, buttons/icons to control a garage door, buttons/icons to adjust the temperature (thermostat), etc.).

In the case of conventional controls used on smart phones, very few or no option are provided to customize or personalize the controls (e.g., connected home security, video and home automation) by home owners or users. Mobile apps are usually provided to users with static icons and fixed controls. Very little provision is made for customizing of these controls. More important, however, is that no intelligence is provided for the control of devices based upon a user's current location.

The claimed invention solves these problems using a number of novel approaches. For example, the solution works based on the concept of automatic updating the user interface (UI) of mobile applications based on the location of the mobile device inside the home or business in order to control the device and sensors of the connected home systems (e.g., security, video and home automation).

Low cost wireless location sensors or location indicators (e.g., Bluetooth Low Energy Devices, etc.) can be placed anywhere inside the house. The location sensors registers its position (proximity) with the mobile app or the existing connected automation devices/sensors itself can be used as a location sensing sensor or location indicator in the case of a dual mode transceiver.

Each location sensor or location indicator has its own unique system identifier. These location sensors or location indicators are placed close to each connected home devices/sensors. Additional location sensors or indicators can be placed where necessary based upon need. Within the mobile app, the user can pair each location sensor or indicator with one or more connected home devices/sensors installed at that particular location. Once the mobile device receives a signal from a wireless sensor or location indicator, then the mobile app checks for an associated connected home device/sensor and loads the UI accordingly in order to control the devices available at that location.

The UI controls (shown on the display of the portable device) get updated automatically once the mobile device (user) moves from location 1 to location 2. For example, assume that a user with a mobile device is in the living room of his/her home. The app on the mobile device will show the UI options to control the living room automation devices (e.g., lights and window). Now assume that the user with the mobile device moves from the living room to the bedroom. In this case, the app updates the UI options to control the automation devices in the bedroom (e.g., lights, thermostat, etc.).

The UI controls can be operative and updated even while the mobile device has a locked screen. There is no need to unlock the mobile device (e.g., a phone, a tablet, etc.) to control the devices. Optionally, the mobile app can request a personal identification number (PIN) to activate or otherwise control the security system devices (e.g., disarming a security panel, unlocking a door, etc.).

Optionally, each UI update can have a customized background image as shown in FIGS. 2-5. For example, if the mobile device detects a living room position indicator, then the mobile device may show an image of the living room on the display with icons of the controlled automation devices shown superimposed over the image at the appropriate locations.

Figure 2:
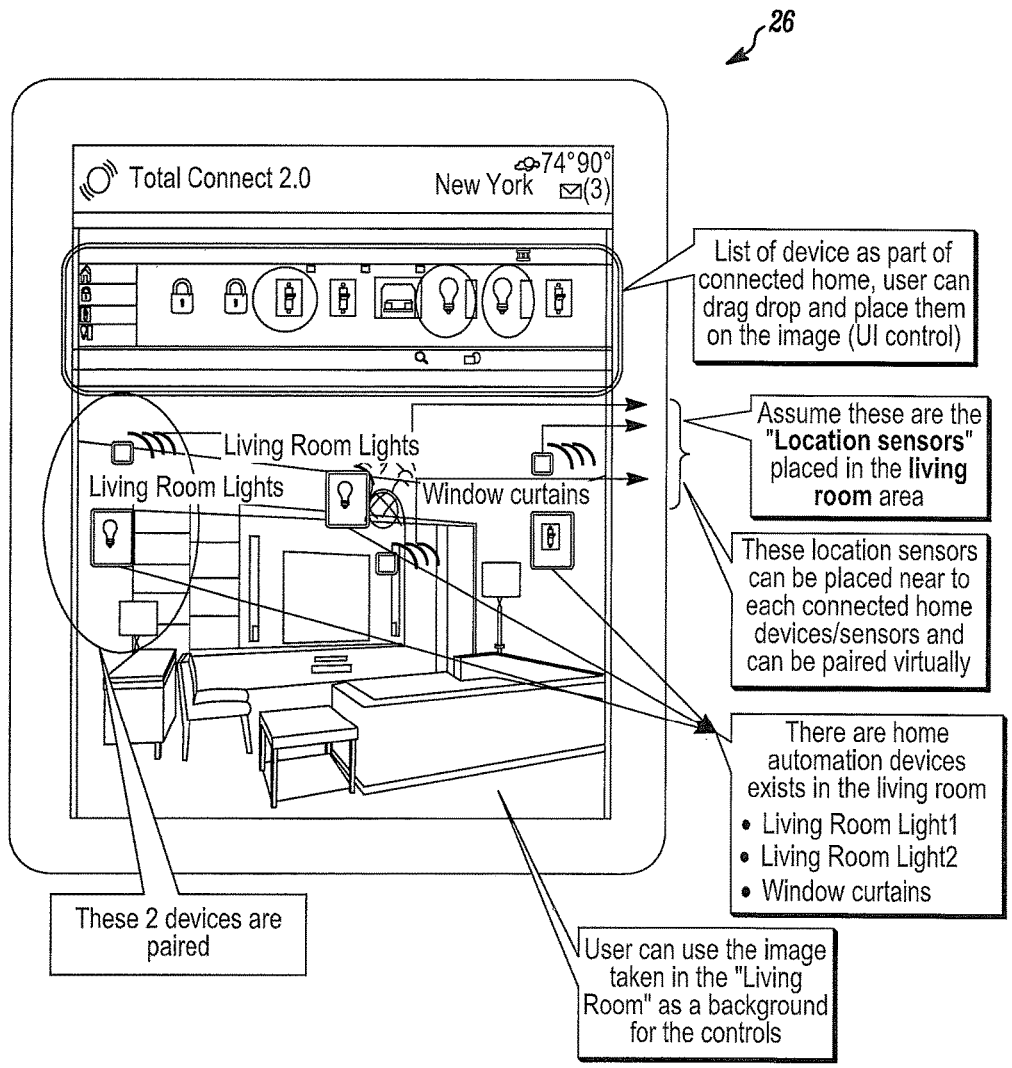
FIG. 2 depicts the portable user device of FIG. 1 during a set of configuration steps.

FIG. 2 shows a screen that may be displayed on the portable device. As shown, a menu of icons of user devices can be displayed along a top of the screen. The icons from the menu may be dragged to an appropriate location of the room. The association between the icon and location indicator may be created by dragging and dropping the user device icon on top of the icon of the location indicator.

Figure 3:
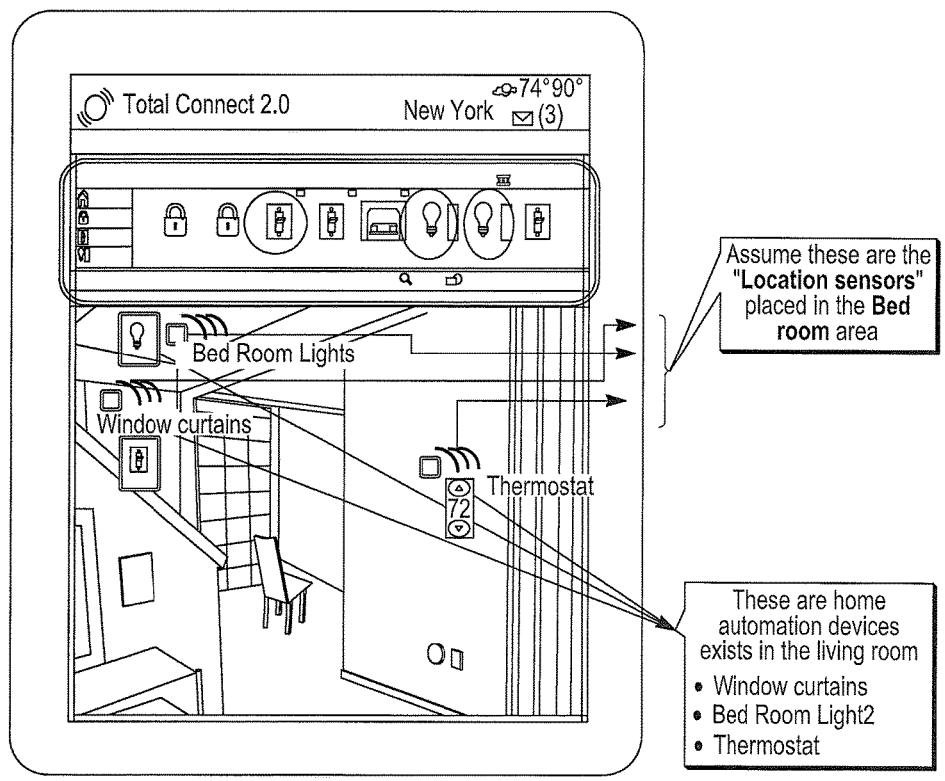
FIG. 3 depicts the portable device of FIG. 1 showing data from a thermostat.

FIG. 3 depicts an icon of a thermostat. The icon includes up and down buttons for the thermostat. The icon further includes a window with an indicated temperature in the room.

Figure 4:
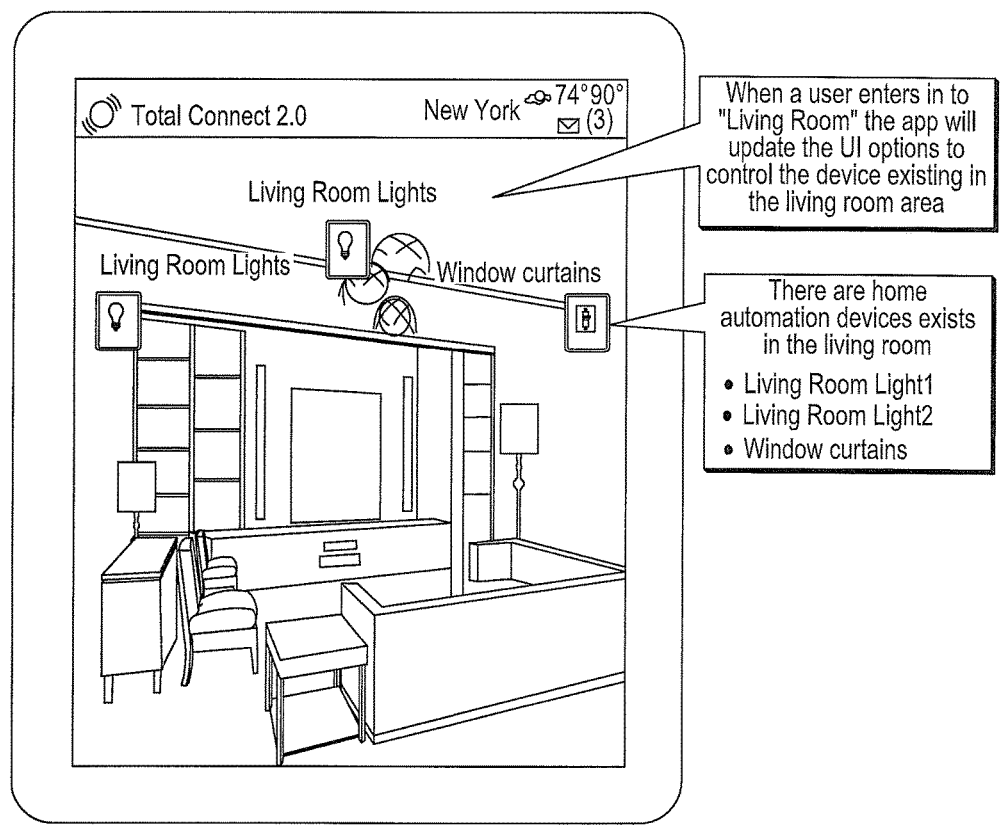
FIG. 4 depicts the updating of the user interface of the portable device of FIG. 1 as a user enters a living room.

FIG. 4 depicts another view of a living room. In this case, the control feature includes lighting as well as a window curtain control.

Figure 5:
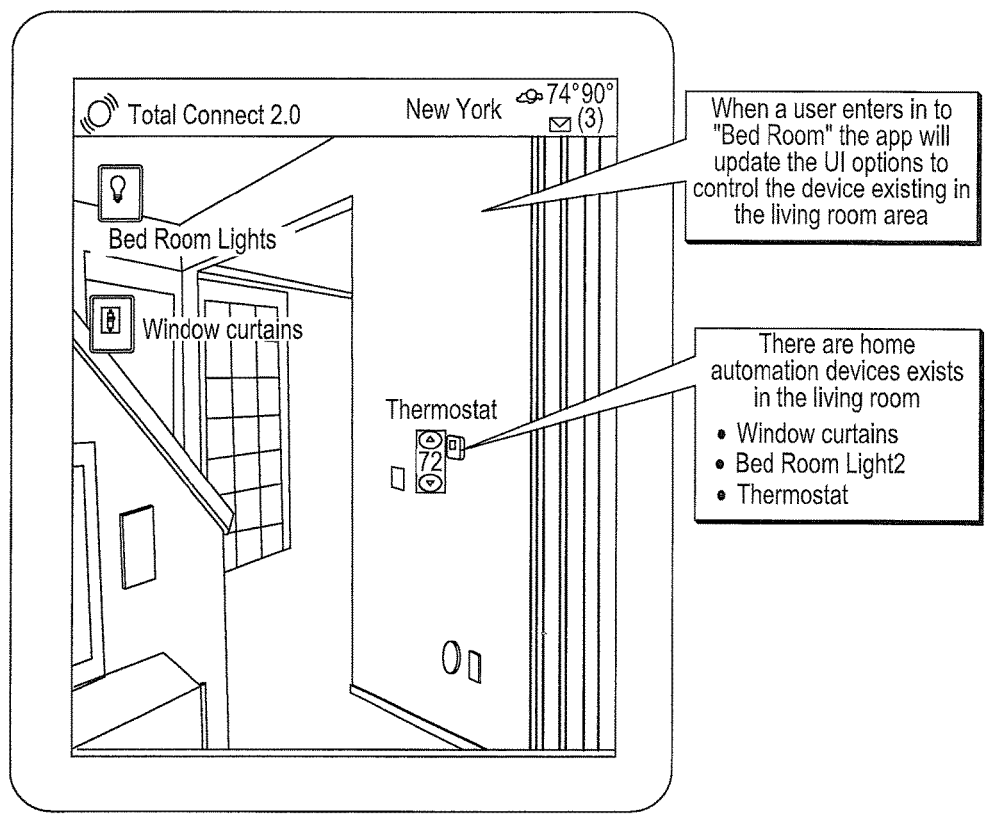
FIG. 5 depicts the updating of the portable device as the user enters a bedroom.

FIG. 5 shows an updated window as the user enters the bedroom. As shown, the window includes two lighting controls and a thermostat control.

Figure 6:
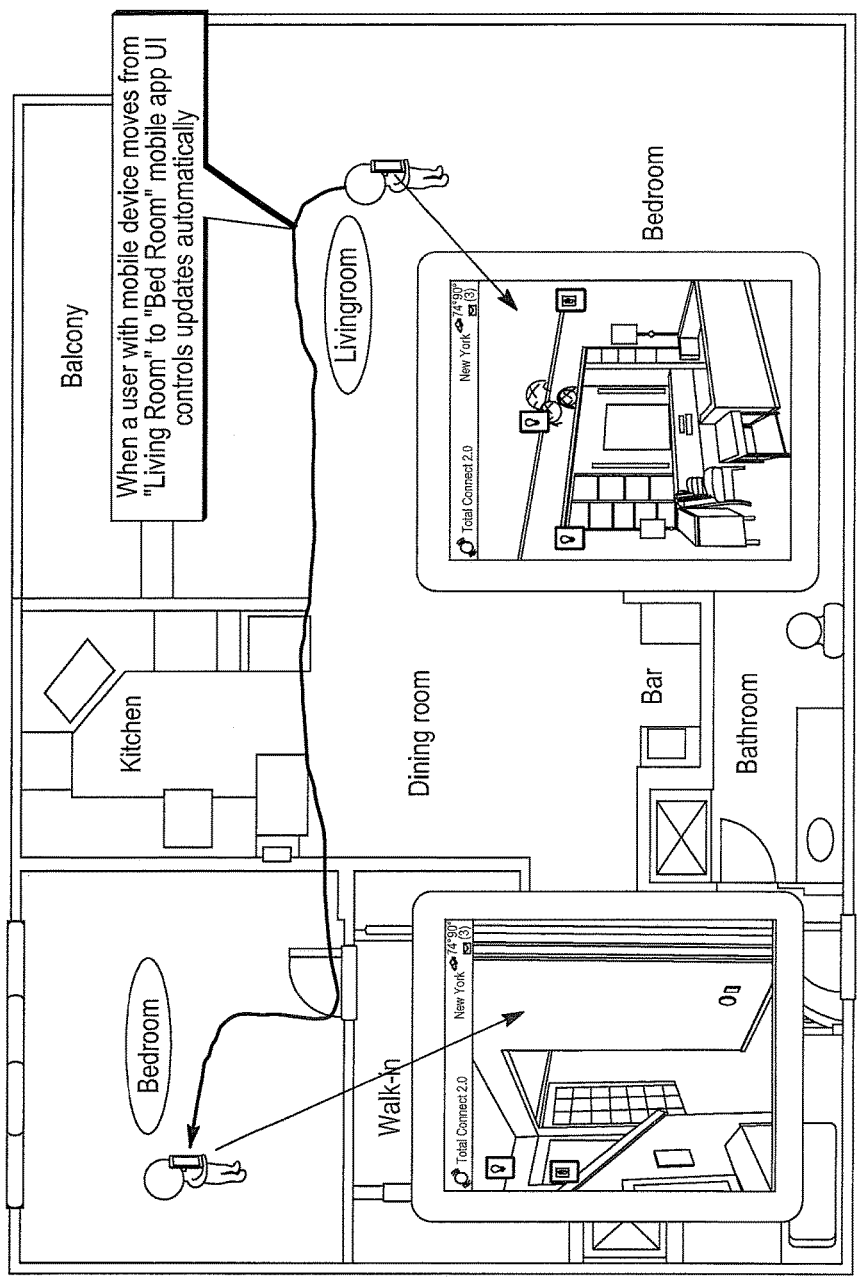
FIG. 6 depicts the path of a user of the portable device of FIG. 1.

The mobile device may include a control options app executing on a control options processor. The control options app can also show status information of the devices (e.g., the temperature in a room) as the user moves through an area (as shown in FIG. 6) or any other information that is available for the automation device.

In general, the system includes a plurality of user controlled devices, each located at a respective predetermined location within a geographic area of a user, a respective location indicator associated with each of the plurality of user controlled devices and a portable user device. The portable user device further includes a respective controlling application of each of the plurality of user controlled devices embodied in a memory of the portable user device, a monitoring processor of the portable user device that detects a location of the portable user device within the geographic area based upon a wireless signal from one of the respective location indicators and an interface processor of the portable device that loads the controlling application of one of the plurality of user controlled devices based upon the detected location of the portable user device.

Alternatively, the system includes a user controlled device located at a predetermined location within a geographic area of a user, a location indicator associated with the user controlled device that transmits a low power wireless signal including a unique system identifier associated with the user controlled device and a portable user device. The portable user device further includes a controlling application of the user controlled device embodied in a memory of the portable user device, a monitoring processor of the portable user device that detects the user controlled device within the geographic area based upon the wireless signal from the location indicator; and an interface processor of the portable device that loads the controlling application of the user controlled device based upon the detected signal from the location indicator.

Alternatively, the system includes a plurality of user controlled devices located at respective predetermined locations within a geographic area of a user, a respective location indicator associated with each of the plurality of user controlled devices that each transmit a low power wireless signal including a unique system identifier associated with the user controlled device and a wireless portable user device. The portable user device further includes a respective controlling application of each of the plurality of user controlled devices embodied in a memory of the portable user device, a monitoring processor of the portable user device that detects a location indicator within the geographic area based upon the wireless signal from the location indicator and an interface processor of the portable device that loads the controlling application of one of the plurality of user controlled devices based upon the unique identifier of the detected wireless signal from the location indicator.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
a plurality of user controlled devices, each of the plurality of user controlled devices located at a respective predetermined location within a respective region of a geographic area;
a portable user device;
a respective location indicator device that is associated with each of the plurality of user controlled devices by dragging a respective first icon for each of the plurality of user controlled devices on top of a respective second icon for the respective location indicator device displayed on a display of the portable user device;
a respective controlling application of each of the plurality of user controlled devices embodied in a memory of the portable user device;
a monitoring processor of the portable user device that, after the respective location indicator device is associated with each of the plurality of user controlled devices, detects a current location of the portable user device within the geographic area based upon a respective wireless signal from the respective location indicator device associated with one of the plurality of user controlled devices;
an interface processor of the portable user device that loads the respective controlling application of the one of the plurality of user controlled devices based upon the current location of the portable user device; and
a display of the portable user device that adjusts a background for the respective controlling application of the one of the plurality of user controlled devices to an image of the respective region in which the respective predetermined location at which the one of the plurality of user controlled devices is located in response to the portable user device receiving the respective wireless signal from the respective location indicator device associated with the one of the plurality of user controlled devices.

2. The apparatus as in claim 1 wherein the respective location indicator device associated with each of the plurality of user controlled devices includes a respective Bluetooth low energy device.

3. The apparatus as in claim 1 wherein the respective location indicator device associated with each of the plurality of user controlled devices includes a respective unique system identifier saved in a respective memory of the respective location indicator.

4. The apparatus as in claim 3 further comprising:
a cross-reference file located within the memory of the portable user device,
wherein the cross-reference file cross references the respective unique system identifier associated with each of the plurality of user controlled devices with at least some other ones of the plurality of user controlled devices.

5. The apparatus as in claim 1 wherein the plurality of user controlled devices includes one or more of a lighting control, a window blind control, a door lock control, a security system control, a garage door control, and a heating system control.

6. The apparatus as in claim 1 wherein the portable user device includes one of an iPhone and Android device.

7. An apparatus comprising:
a user controlled device located at a predetermined location within a region of a geographic area;
a portable user device;
a location indicator device that is associated with the user controlled device by dragging a first icon for the user controlled device on top of a second icon for the location indicator device displayed on a display of the portable user device, wherein the location indicator device transmits a low power wireless signal, and wherein after the location indicator device is associated with the user controlled device, the low power wireless signal includes a unique system identifier associated with the user controlled device;

a controlling application of the user controlled device embodied in a memory of the portable user device;

a monitoring processor of the portable user device that determines a current location of the portable user device based on the low power wireless signal received from the location indicator device and that, after the location indicator devices is associated with the user controlled device, detects the user controlled device within the geographic area based upon the low power wireless signal from the location indicator device;

an interface processor of the portable user device that loads the controlling application of the user controlled device based upon the low power wireless signal from the location indicator device; and a display of the portable user device that adjusts a background for the controlling application of the user controlled device to an image of the region in response to the portable user device receiving the low power wireless signal from the location indicator device.

8. The apparatus as in claim 7 further comprising an automation processor that executes the controlling application of the user controlled device.

9. The apparatus as in claim 7 wherein the location indicator device includes a Bluetooth low energy device.

10. The apparatus as in claim 7 wherein the user controlled device includes one or more of a lighting control, a window blind control, a door lock control, a security system control, a garage door control, and a heating system control.

11. The apparatus as in claim 7 further comprising a cross-reference file stored in the memory of the portable user device that cross references a unique system identifier of the location indicator device with the controlling application of the user controlled device.

12. An apparatus comprising:

a plurality of user controlled devices, each of the plurality of user controlled devices located at a respective predetermined location within a respective region of a geographic area;

a wireless portable user device;

a respective location indicator device that is associated with each of the plurality of user controlled devices by dragging a respective first icon for each of the plurality of user controlled devices on top of a respective second icon for the respective location indicator devices displayed on a display of the wireless portable user device, wherein the respective location indicator device associated with each of the plurality of user controlled devices transmits a respective low power wireless signal that includes a respective unique system identifier associated with a respective one of the plurality of user controlled devices;

a respective controlling application of each of the plurality of user controlled devices embodied in a memory of the wireless portable user device;

a monitoring processor of the wireless portable user device that, after the respective location indicator device is associated with each of the plurality of user controlled devices, detects respective location indicator device associated with one of the plurality of user controlled devices within the geographic area based upon receiving the respective low power wireless signal from the respective location indicator device associated with the one of the plurality of user controlled devices within the geographic area;

an interface processor of the wireless portable device that loads the respective controlling application of the one of the plurality of user controlled devices within the geographic area based upon receiving the respective unique system identifier associated with the one of the plurality of user controlled devices; and a display of the wireless portable user device that adjusts a background for the respective controlling application of the one of the plurality of user controlled devices within the geographic area to an image of the respective region in which the respective predetermined location at which the one of the plurality of user controlled devices within the geographic area is located in response to the wireless portable user device receiving the respective wireless signal from the respective location indicator device associated with the one of the plurality of user controlled devices.

13. The apparatus as in claim 12 wherein the wireless portable user device includes one of an iPhone and Android device.

14. The apparatus as in claim 12 further comprising a cross-reference file within the memory of the wireless portable user device that cross references the respective unique system identifier of the one of the plurality of user controlled devices with the respective controlling application of the one of the plurality of user controlled devices.

15. The apparatus as in claim 12 wherein the respective location indicator device associated with each of the plurality of user controlled devices includes a respective Bluetooth low energy device.

16. The apparatus as in claim 12 wherein the plurality of user controlled devices includes one or more of a lighting control, a window blind control, a door lock control, a security system control, a garage door control, and a heating system control.

* * * * *